(12) United States Patent
Smith et al.

(10) Patent No.: US 9,765,641 B2
(45) Date of Patent: Sep. 19, 2017

(54) SYSTEM AND METHOD FOR VIBRATION ISOLATION

(75) Inventors: Michael R. Smith, Colleyville, TX (US); Frank B. Stamps, Colleyville, TX (US); Maurice D. Griffin, Euless, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 1468 days.

(21) Appl. No.: 13/593,113

(22) Filed: Aug. 23, 2012

(65) Prior Publication Data

US 2014/0064922 A1   Mar. 6, 2014

(51) Int. Cl.
*B64C 27/00* (2006.01)
*F01D 25/06* (2006.01)
*F16F 13/08* (2006.01)

(52) U.S. Cl.
CPC ............ *F01D 25/06* (2013.01); *B64C 27/001* (2013.01); *F16F 13/08* (2013.01); *Y10T 29/49321* (2015.01)

(58) Field of Classification Search
CPC .............. B64C 27/00; B64C 2027/002; B64C 2027/004; B64C 27/01; F16F 9/435; F16F 9/065; F16F 13/08; F16F 13/18; F16F 13/24; F16F 13/105; F16F 9/43; F01D 25/06
See application file for complete search history.

(56) References Cited

U.S. PATENT DOCUMENTS

| 4,811,919 A | 3/1989 | Jones .............................. 244/54 |
| 5,540,549 A | 7/1996 | McGuire ....................... 416/140 |
| 6,032,936 A | 3/2000 | Redinger .................. 267/140.11 |
| 6,131,709 A * | 10/2000 | Jolly .......................... F16F 9/20 137/909 |
| 6,293,532 B2 * | 9/2001 | McGuire ................... 267/140.13 |
| 6,378,851 B1 * | 4/2002 | McGuire ................. F16F 13/06 267/140.13 |

(Continued)

FOREIGN PATENT DOCUMENTS

WO   WO 2010038865 A1 *   4/2010   .............. F16F 9/363

OTHER PUBLICATIONS

EPO Communication Pursuant to Article 94(3) regarding Application No. 12 189 767.2-1754, dated Dec. 4, 2014 (5 pages).

(Continued)

*Primary Examiner* — Brian M O'Hara
*Assistant Examiner* — Magdalena Topolski
(74) *Attorney, Agent, or Firm* — Baker Botts L.L.P.

(57) ABSTRACT

In accordance with one embodiment of the present disclosure, a system includes a first housing, a second housing, a seal, and a spring system. The first housing includes a first volume of fluid. The first housing is capable of connecting to a first element and to a second element, and is also capable of reducing an amount of movement transferred from the first element to the second element. The second housing is connected to the first housing. The second housing includes a second volume of fluid and a volume of gas. The first volume of fluid is in fluid communication with the second volume of fluid. The seal is capable of separating the second volume of fluid from the volume of gas. The spring system is capable of applying pressure to the first volume of fluid and the second volume of fluid.

18 Claims, 4 Drawing Sheets

(56) References Cited

U.S. PATENT DOCUMENTS

| | | | | |
|---|---|---|---|---|
| 6,431,530 | B1 | 8/2002 | Stamps et al. | 267/136 |
| 6,695,106 | B2 | 2/2004 | Smith et al. | 188/378 |
| 2002/0060268 | A1* | 5/2002 | Smith | B64C 27/001 244/54 |
| 2004/0084818 | A1 | 5/2004 | Russell | 297/140.11 |
| 2006/0151272 | A1 | 7/2006 | Smith et al. | 188/378 |
| 2006/0261530 | A1* | 11/2006 | Stamps | F16F 13/24 267/140.11 |
| 2010/0301160 | A1* | 12/2010 | Ward | F16F 13/08 244/54 |
| 2011/0094833 | A1* | 4/2011 | Marking | F16F 9/064 188/1.11 R |
| 2011/0221107 | A1* | 9/2011 | Kashiwabara | F16F 9/363 267/140.13 |

OTHER PUBLICATIONS

Extended European Search Report; Application No. 12189767.2-2422; pp. 5.

\* cited by examiner

SYSTEM AND METHOD FOR VIBRATION ISOLATION

TECHNICAL FIELD

This disclosure relates in general to a system that includes vibrating elements and more particularly to a system and method for vibration isolation.

BACKGROUND

Traditionally, one or more vibration isolators have been utilized in an aircraft, vehicle, or other system to prevent the movement (i.e., vibration, oscillation, etc.) of a component from being transferred to other components of the aircraft, vehicle, or system. These traditional vibration isolators, however, have disadvantages which may be addressed in this disclosure.

SUMMARY OF THE DISCLOSURE

In accordance with one embodiment of the present disclosure, a system includes a first housing, a second housing, a seal, and a spring system. The first housing includes a first volume of fluid. The first housing is capable of connecting to a first element and to a second element, and is also capable of reducing an amount of movement transferred from the first element to the second element. The second housing is connected to the first housing. The second housing includes a second volume of fluid and a volume of gas. The first volume of fluid is in fluid communication with the second volume of fluid. The seal is positioned within the second housing and is capable of separating the second volume of fluid from the volume of gas. The spring system is positioned within the second housing and is capable of applying pressure to the first volume of fluid and the second volume of fluid.

Numerous technical advantages are provided according to various embodiments of the present disclosure. Particular embodiments of the disclosure may exhibit none, some, or all of the following advantages depending on the implementation. In particular embodiments, the system includes a seal that may separate the second volume of fluid from the volume of gas, thereby preventing the fluid from absorbing the volume of gas. This may stabilize internal fluid pressures in the system, thereby allowing the system to be used for longer durations without being refilled with gas. In particular embodiments, the seal may further allow gas to be purged from the fluid in the system. In particular embodiments, the system includes a spring system that may apply a constant positive pressure. This may also stabilize internal fluid pressures in the system, thereby allowing the system to be used for longer durations without being refilled with gas. In particular embodiments, the system includes a pressure indicator that may allow a user to more easily determine the internal fluid pressures in the system. In particular embodiments, the system includes a input port that may allow fluid to be added to the system, thereby allowing the system to be used at different temperatures.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE DRAWINGS

Embodiments of the present disclosure and their advantages are best understood by referring to FIGS. 1 through 4 of the drawings, like numerals being used for like and corresponding parts of the various drawings.

Figure 1:
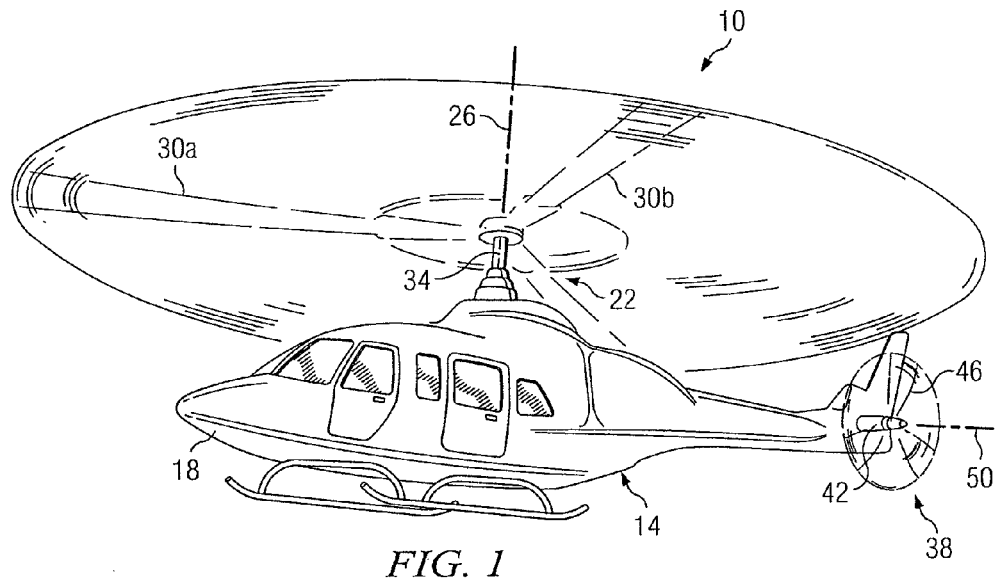
FIG. 1 illustrates one embodiment of a system that includes one or more elements that may move (i.e., by vibrating, oscillating, etc.) and/or that may be isolated from such movement.

FIG. 1 illustrates one embodiment of a system 10 that includes one or more elements that may move (i.e., by vibrating, oscillating, etc.) and/or that may be isolated from such movement. According to the illustrated embodiment, system 10 is a helicopter 14. Helicopter 14 may include a fuselage 18 and a main rotor assembly 22, including main rotor blades 30 and a main rotor shaft 34. Main rotor blades 30 generally rotate about a longitudinal axis 26 of main rotor shaft 34. Helicopter 14 may further include a tail rotor assembly 38, including tail rotor blades 46 and a tail rotor shaft 42. Tail rotor blades 46 generally rotate about a longitudinal axis 50 of tail rotor shaft 42. In particular embodiments, helicopter 14 may include one or more vibration isolation systems (not shown) that may isolate the movement of a first element of helicopter 14 from another element of helicopter 14. For example, helicopter 14 may include one or more vibration isolation systems that may isolate the fuselage 18 of helicopter 14 from movements (such as mechanical vibrations) arising from the engine, transmission, and/or rotors of helicopter 14.

Figure 2A:
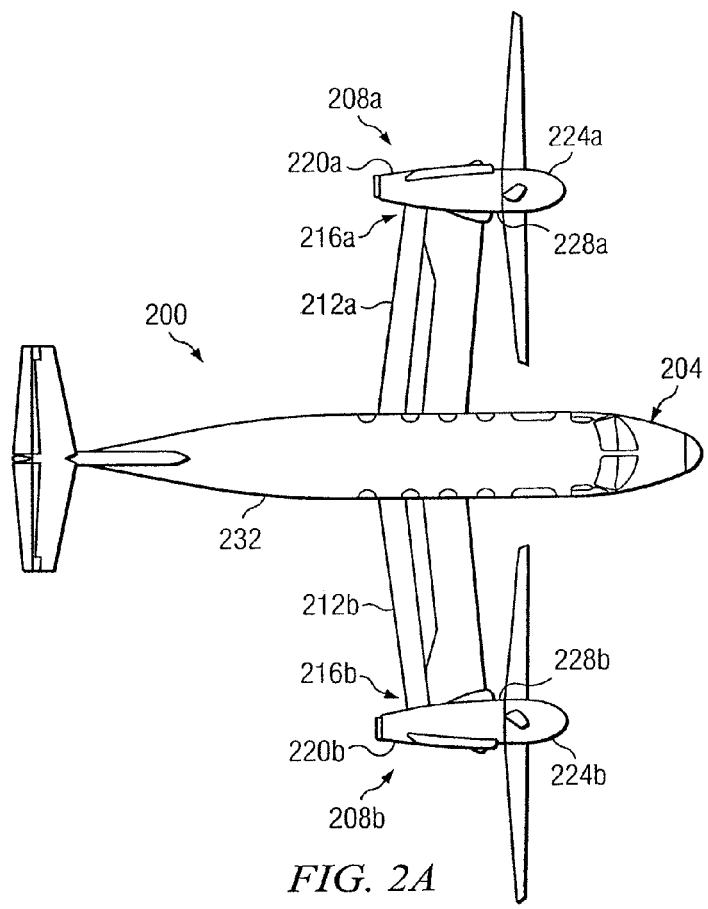
FIGS. 2A and 2B illustrate one embodiment of another system that includes one or more elements that may move (i.e., by vibrating, oscillating, etc.) and/or that may be isolated from such movement.
Figure 2B:
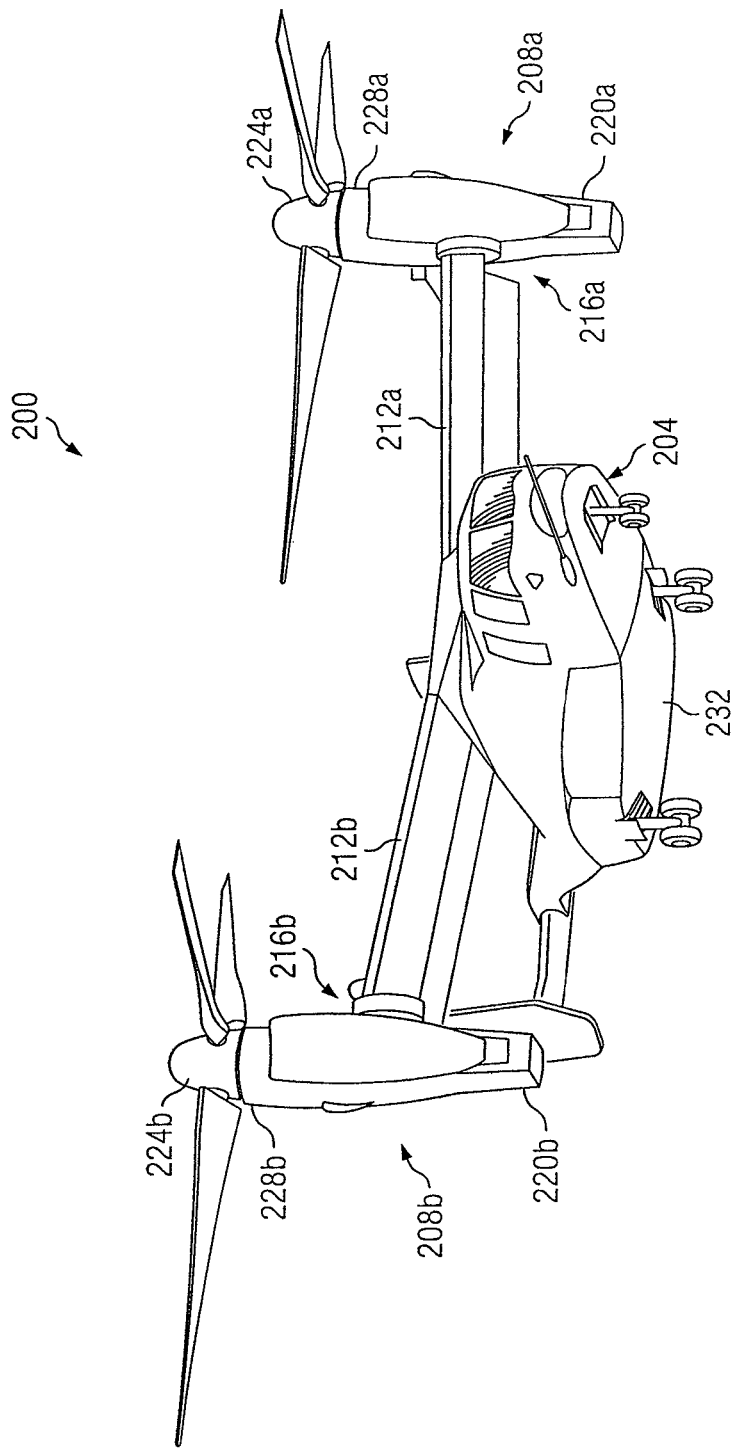

FIGS. 2A and 2B illustrate one embodiment of another system 200 that includes one or more elements that may move (i.e., by vibrating, oscillating, etc.) and/or that may be isolated from such movement. According to the illustrated embodiment, system 200 is a tilt rotor aircraft 204. Tilt rotor aircraft 204 may include rotor assemblies 208a and 208b carried by wings 212a and 212b. Rotor assemblies 208a and 208b may be disposed at end portions 216a and 216b of wings 212a and 212b, respectively. Tilt rotor assemblies 208a and 208b may include nacelles 220a and 220b, which carry the engines and transmissions of tilt rotor aircraft 204, as well as, rotor hubs 224a and 224b on forward ends 228a and 228b of tilt rotor assemblies 208a and 208b, respectively.

Tilt rotor assemblies 208a and 208b may rotate (or otherwise move) relative to wings 212a and 212b between a helicopter mode in which tilt rotor assemblies 208a and 208b are tilted upward such that tilt rotor aircraft 204 flies like a conventional helicopter (as is illustrated in FIG. 2B); and an airplane mode in which tilt rotor assemblies 208a and 208b are tilted forward, such that tilt rotor aircraft 204 flies like a conventional propeller driven aircraft (as is illustrated in FIG. 2A). Tilt rotor aircraft 204 may further include fuselage 232, coupled to wings 212a and 212b. In particular embodiments, tilt rotor aircraft 204 may include one or more vibration isolation systems (not shown) that may isolate the movement of a first element of tilt rotor aircraft 204 from another element of tilt rotor aircraft 204. For example, tilt rotor aircraft 204 may include one or more vibration isolation systems that may isolate the fuselage 232 of tilt rotor aircraft 204 from movements (such as mechanical vibrations) arising from the engine, transmission, and/or rotors of tilt rotor aircraft 204.

Although FIGS. 2A and 2B illustrate the tilt rotor aircraft 204 as including only two tilt rotor assemblies 208a and 208b. In particular embodiments, tilt rotor aircraft 204 may include any suitable number of tilt rotor assemblies 208. For example, tilt rotor aircraft 204 may include four tilt rotor assemblies 208.

Although FIGS. 1, 2A, and 2B illustrate helicopter 14 and tilt rotor aircraft 204 as particular examples of systems that include one or more elements that may move (i.e., by vibrating, oscillating, etc.) and/or that may be isolated from such movement, vibration isolation systems may be utilized an any other system that includes one or more elements that may move and/or that may be isolated from such movement. Examples of such systems that may include vibration isolation systems may include an aircraft (such as an airplane, jet-powered aircraft, rocket-powered aircraft, spacecraft, blimp, etc.), a vehicle (such as a car, truck, train, all-terrain vehicle (ATV), ship, boat, bulldozer, motorcycle, etc.) or any other system that includes one or more elements that may move (i.e., by vibrating, oscillating, etc.) and/or that may be isolated from such movement.

Figure 3:
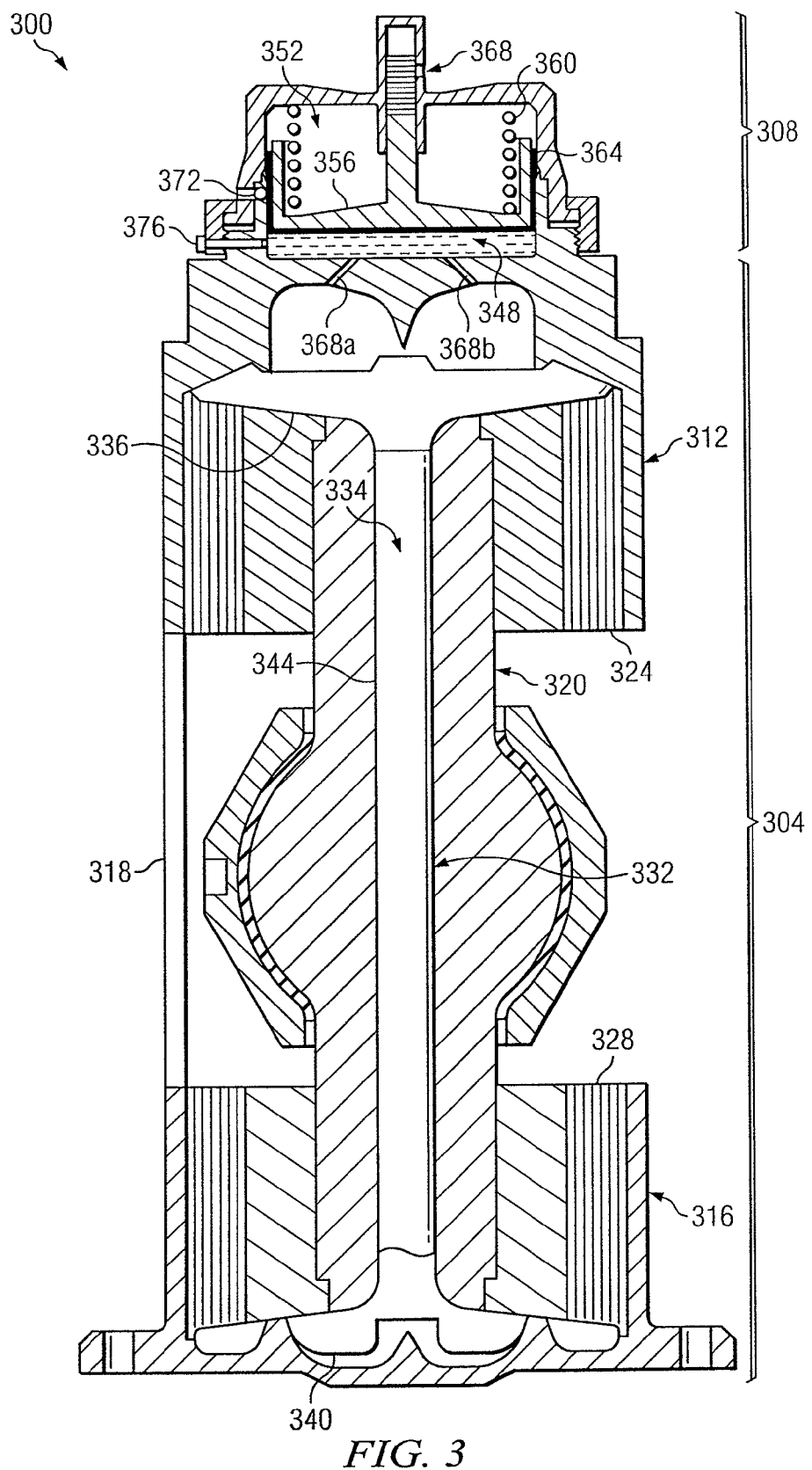
FIG. 3 illustrates one embodiment of a vibration isolation system.

FIG. 3 illustrates one embodiment of a vibration isolation system 300. According to the illustrated embodiment, vibration isolation system 300 includes first housing 304 and second housing 308. In particular embodiments, first housing 304 (and one or more components of first housing 304) may be referred to as a Liquid Inertia Vibration Eliminator (LIVE) mount. In particular embodiments, second housing 308 (and one or more components of second housing 308) may be referred to as an accumulator.

First housing 304 (and one or more components of first housing 304) may isolate a second element from the movement of a first element. For example, with regard to FIG. 1, first housing 304 may isolate the fuselage 18 of helicopter 14 from one or more movements (i.e., vibrations, oscillations, etc.) of main rotor assembly 22 of helicopter 14. In particular embodiments, vibration isolation refers to the utilization of acceleration of a fluid body to cancel the displacement of vibration. For example, a simple force equation for vibration is set forth as follows:

$$F = m\ddot{x} + c\dot{x} + kx$$

Based on the above equation, vibration isolation utilizes acceleration of a fluid body $m\ddot{x}$ to cancel the displacement of vibration $kx$. In particular embodiments, vibration isolation is distinguishable from damping (which sometimes may be erroneously referred to as "isolation"). For example, damping is concerned with restricting flow of a fluid or other body, and thus velocity $c\dot{x}$ and does not cancel vibration, but merely absorbs its frequency. In particular embodiments, by isolating the second element from the movement of the first element, first housing 304 may reduce an amount of movement transferred from the first element to the second element. In particular embodiments, such isolation may substantially reduce an amount of movement transferred from the first element to the second element. In particular embodiments, substantially reducing an amount of movement transferred from a first element to a second element may refer to preventing 90-95% of the movement of the first element from being transferred to the second element.

First housing 304 may be any suitable housing, compartment, container, shell, or any other element that may isolate a second element from the movement of a first element. First housing 304 may have any suitable size and/or shape. For example, the size and/or shape of first housing 304 may vary so that first housing 304 (and second housing 308) may fit in any aircraft, vehicle, and/or system that includes one or more elements that may move and/or that may be isolated from such movement. As an example, with regard to FIG. 1, the size and/or shape of first housing 304 (and second housing 308) may be configured in order to allow first housing 304 (and second housing 308) to fit in helicopter 14 and isolate fuselage 18 of helicopter 14 from one or more movements of rotor assembly system 22. Furthermore, first housing 304 may be made of any suitable material that allows first housing 304 (and second housing 308) to be utilized in any system that includes one or more elements that may move and/or that may be isolated from such movement.

According to the illustrated embodiment, first housing 304 includes a first portion 312, a second portion 316, and a moveable portion 320. First portion 312 and second portion 316 may each connect (directly or indirectly) to a second element (examples of which are described below) that may be isolated from the movement of first element. First portion 312 and second portion 316 may connect to the second element in any suitable manner. For example first portion 312 and second portion 316 may connect to the second element by welding, bolting, clipping, being screwed into (or onto) the second element, being integrated with the second element (such as when first portion 312 and/or second portion 316 is manufactured as a portion of the second element), any other method of connection, or any combination of the preceding. In particular embodiments, first portion 312 and second portion 316 may not be directly connected to each other, but may be connected indirectly via other components of vibration isolation system 300, such as a connective housing 318.

Moveable portion 320 may connect (directly or indirectly) to a first element (examples of which are described below) that may move. Moveable portion 320 may connect to the first element in any suitable manner. For example, moveable portion 320 may connect to the first element by welding, bolting, clipping, being screwed into (or onto) the first element, being integrated with the first element (such as when moveable portion 320 is manufactured as a portion of the first element), any other method of connection, or any combination of the preceding. In particular embodiments, movable portion 320 may be connected to a bearing, such as a spherical bearing, which is connected to the first element.

As is illustrated, moveable portion 320 is further connected to first portion 312 and second portion 316. Moveable portion 320 is connected to first portion 312 and second portion 316 in any suitable manner. For example, moveable portion 320 may be resiliently connected to first portion 312 by a bearing 324, and moveable portion 320 may also be resiliently connected to second portion 316 by a bearing 328. Bearings 324 and 328 may be any suitable type of bearing. For example, bearings 324 and 328 may be elastomer tube form bearings. In such an example, the elastomer used for the bearings 324 and 328 may have a long fatigue life and exhibit low damping characteristics. An example of such an elastomer may be LORD SPE® X elastomer manufactured by LORD® Corporation. In particular embodiments, the elastomer used for the bearings 324 and 328 may vary based on the application of the vibration isolation system 300. Bearings 324 and 328 may have any suitable size and/or shape. For example, the size and/or shape of bearings 324 and 328 may vary based upon the system in which vibration isolation system 300 is utilized. In particular embodiments, the length of bearings 324 and 328 may each be sufficient to minimize elastomer bulging caused by oscillatory pressure in vibration isolation system 300. In particular embodiments, bearings 324 and 328 may be compliant spring members for vibration isolation system 300.

According to the illustrated embodiment, first housing 304 further includes a fluid chamber 332 that holds a first volume of fluid 334. As illustrated, fluid chamber 332 includes an upper fluid chamber 336, a lower fluid chamber 340, and a tuning port 344. Upper fluid chamber 336 is defined by one or more inner surfaces of first portion 312, one or more surfaces of moveable portion 320, and bearing 324. Lower fluid chamber 340 is defined by one or more inner surfaces of second portion 316, one or more inner surfaces of moveable portion 320, and bearing 328. Tuning port 344 connects upper fluid chamber 336 to lower fluid chamber 340, allowing fluid communication between upper fluid chamber 336 and lower fluid chamber 340. Although fluid chamber 332 is illustrated as being positioned within moveable portion 320, in particular embodiments, fluid chamber 332 may be externally connected to moveable portion 320.

Fluid chamber 332 may be pressurized so to prevent cavitations. Fluid chamber 332 may be pressurized to any suitable pressure that may prevent cavitations. For example, fluid chamber 332 may be pressurized to 50 pounds per square inch (psi), 100 psi, 150 psi, 300 psi, 500 psi, 1,000 psi, or any other suitable pressure.

The first volume of fluid 334 may include any suitable fluid (i.e., liquid and/or gas) for isolating a second element from one or more movements of a first element. For example, the first volume of fluid 334 may be SPF® I manufactured by LORD® Corporation, mercury, hydraulic fluid, an inviscid relatively dense fluid, or any other suitable fluid for isolating a second element from one or more movements of a first element. In particular embodiments, the first volume of fluid 334 may have a low viscosity, may be relatively dense, and may be noncorrosive. In particular embodiments, the first volume of fluid 334 may have a dense particulate matter suspended therein. Furthermore, the type of fluid (and properties) of the first volume of fluid 334 may also vary depending on the application of the vibration isolation system 300. Additionally, the mass of the first volume of fluid 334 may in some embodiments be supplemented by the use of a solid slug disposed in the tuning port 344. In particular embodiments, bearings 324 and 328 seal the first volume of fluid 334 inside of upper fluid chamber 336 and/or lower fluid chamber 340 so it does not leak into other portions of first housing 304.

As is discussed above, moveable portion 320 may be connected to the first element, and first portion 312 and second portion 316 may be connected to the second element. The first element includes any element that may move (i.e., by vibrating, oscillating, etc.). For example, the first element may include a dynamic element, such as an engine, pump, generator, gearbox, rotor, transmission, the body of an aircraft or vehicle, the fuselage of an aircraft or vehicle, any other element that may move, or any portion of each of the preceding. In particular embodiments, the first element may be a dynamic element of an aircraft or vehicle. For example, the first element may be main rotor transmission assembly 22 of helicopter 14 of FIG. 1. Because the first element may be part of an aircraft or vehicle, the first element may be connected to the aircraft or otherwise secured to the aircraft or vehicle (on the interior or exterior of the aircraft or vehicle). Unfortunately, it may be disadvantageous for the movement of the first element to be transferred to the second element of the aircraft or vehicle. As such, one or more vibration isolation systems 300 may be utilized to isolate the second element from one or more movements of the first element.

The second element may include any element that may be isolated from the movement of the first element. For example, the second element may include the fuselage of an aircraft, the body of an aircraft, the wings of an aircraft, one or more seats of an aircraft, any other portion of an aircraft, the body of a vehicle, one or more seats of a vehicle, any other portion of a vehicle, or any other element of a system that includes the first element. In particular embodiments, the second element may be the fuselage 18 of helicopter 14 of FIG. 1. In particular embodiments, the second element may be the portion of an aircraft, vehicle, or other system to which the first element is connected to (or otherwise secured to) by vibration isolation system 300.

In operation, first portion 312 and second portion 316 may each be connected (directly or indirectly) to the second element. Furthermore, moveable portion 320 may be connected (directly or indirectly) to the first element. As the first element moves (by vibrating, oscillating, etc.), the movement of the first element may be transferred to moveable portion 320, causing moveable portion 320 to move within vibration isolation system 300. Such movement of moveable portion 320 may increase the volume of upper fluid chamber 336 while decreasing the volume of lower fluid chamber 340 (or vice versa). For example, as the movement of moveable portion 320 increases the volume of upper fluid chamber 336, the volume of lower fluid chamber 340 is decreased. This change in volume may create a pressure differential between upper fluid chamber 336 and lower fluid chamber 340, and may further create a corresponding flow of the first volume of fluid 334 from upper fluid chamber 336 to lower fluid chamber 340 and/or from lower fluid chamber 340 to upper fluid chamber 336 (i.e., the first volume of fluid 334 flows in-between upper fluid chamber 336 and lower fluid chamber 340 as a result of the pressure differential). In particular embodiments, this movement of the first volume of fluid 334 may be in the opposite direction of the movement of the moveable portion 320. The movement of the first volume of fluid 334 may generate an inertial force. In particular embodiments, such an inertial force may reduce (or substantially reduce) an amount of movement that is transferred from the first element to the second element. For example, when the inertial force is within a range of frequencies that correspond to the frequencies of the movement of the first element, the inertial force may isolate the movement of the first element from the second element, thereby reducing an amount of movement transferred from the first element to the second element.

As is discussed above, first housing 304 may isolate a second element from the movement of a first element, thereby reducing an amount of movement transferred from the first element to the second element. Unfortunately, in particular embodiments, such isolation may be disrupted by the changing internal fluid pressures in first housing 304 (and vibration isolation system 300). For example, due to temperatures associated with the environment in which vibration isolation system 300 is used, the first volume of fluid 334 within first housing 304 may expand or contract, thereby changing the internal fluid pressure. As an example, in particular embodiments, the expansion or contraction of the fluid within a temperature range of −45° F. through 150° F. may cause a ±35% change in internal fluid pressure of first housing 304 (and vibration isolation system 300). In particular embodiments, second housing 308 may stabilize such internal fluid pressures.

Second housing 308 may stabilize (or control) internal fluid pressures of first housing 304 (and vibration isolation system 300). Second housing 308 may be any suitable housing, compartment, container, shell, or any other element that may stabilize (or control) internal fluid pressures of first housing 304 (and vibration isolation system 300). Second housing 308 may have any suitable size and/or shape. For example, the size and/or shape of second housing 308 may vary so that second housing 308 (and first housing 304) may fit in any aircraft, vehicle, and/or system that includes one or more elements that may move and/or that may be isolated from such movement. As an example, with regard to FIG. 1, the size and/or shape of second housing 308 (and first housing 304) may be configured in order to allow second housing 308 (and first housing 304) to fit in helicopter 14. Furthermore, second housing 308 may be made of any suitable material that allows second housing 308 (and first housing 304) to be utilized in any system that includes one or more elements that may move and/or that may be isolated from such movement. In particular embodiments, second housing 308 may be open to ambient pressure.

According to the illustrated embodiment, second housing 308 may include a second volume of fluid 348, a volume of gas 352, a piston 356, a spring system 360, and a seal 364. In particular embodiments, each of the second volume of fluid 348, the volume of gas 352, piston 356, spring system 360, and seal 364 may be utilized to stabilize internal fluid pressures in vibration isolation system 300.

The second volume of fluid 348 may be a surplus supply of the first volume of fluid 334. As such, the second volume of fluid 348 may be any suitable fluid for isolating a second element from one or more movements of a first element. In particular embodiments, due to the fact that the second volume of fluid 348 may be a surplus supply of the first volume of fluid 334, the second volume of fluid 348 may be the same type of fluid as the first volume of fluid 334. The second volume of fluid 348 may be in fluid communication with the first volume of fluid 334 in first housing 304. For example, first housing 304 may include one or more orifices 368 that may allow a portion of the second volume of fluid 348 to move from the second housing 308 into the first housing 304. In particular embodiments, such movement may occur when low temperatures cause the first volume of fluid 334 in first housing 304 to contract. As another example, orifices 368 may also allow a portion of the first volume of fluid 334 to move from the first housing 304 into the second housing 308. Such movement may occur when high temperatures cause the first volume of fluid 334 in first housing 304 to expand. In particular embodiments, the fluid communication between the first volume of fluid 334 and the second volume of fluid 348 may allow the fluid to expand and contract while the internal fluid pressure remains stabilized.

In order to provide fluid communication between the first volume of fluid 334 and the second volume of fluid 348, first housing 304 may include any number of orifices 368. Furthermore, orifices 368 may have any suitable size and/or shape for providing such fluid communication. For example, orifices 368 may have a diameter of 0.040 inches, 0.045 inches, 0.050 inches, 0.055 inches, 0.060 inches, or any other suitable diameter. In particular embodiments, the size and/or shape of orifices 368 may vary with the viscosity of the fluid. In particular embodiments, the size and/or shape of orifices 368 may allow fluid communication between the first volume of fluid 334 and the second volume of fluid 348, but may prevent pressure pulses (caused by movement of the moveable portion 332) from passing into the second housing 308 in any significant degree.

The volume of gas 352 may include any suitable type of gas. For example, the volume of gas 352 may be air, nitrogen, oxygen, carbon dioxide, any other suitable gas, or any combination of the preceding. In particular embodiments, the volume of gas 352 may stabilize the internal fluid pressures of first housing 304 by applying pressure (in conjunction with piston 356) to the second volume of fluid 348 in second housing 308 and the first volume of fluid 334 in first housing 304. The volume of gas 352 may include any suitable amount of gas for stabilizing the internal fluid pressures of first housing 304.

Piston 356 may include any element that may move in order to apply pressure to the second volume of fluid 348 in second housing 308 and the first volume of fluid 334 in first housing 304. For example, piston 356 may be a metal piston that may move up and down (or in any other direction depending on the orientation of vibration isolation system 300) based on pressure differentials. For example, if the pressure below piston 356 is lower than the pressure above piston 356, piston 356 may move down. On the other hand, if the pressure below piston 356 is greater than the pressure above piston 356, piston 356 may move up. In particular embodiments, the pressure above piston 356 may vary based on the volume of gas 352 and spring system 360, and the pressure below piston 356 may vary based on the contraction/expansion of the first volume of fluid 334 and the second volume of fluid 348.

Spring system 360 may include any element that may apply pressure. For example, spring system 360 may include one or more springs that apply pressure to a second volume of fluid 348 in second housing 308 and the first volume of fluid 334 in first housing 304. In such an example, spring system 360 may include any suitable number of springs, such as one spring, two springs, three springs, four springs, or any other suitable number of springs. In particular embodiments, spring system 360 may include one or more mechanical springs. In particular embodiments, spring system 360 may apply a constant positive pressure to the second volume of fluid 348 in second housing 308 and the first volume of fluid 334 in first housing 304. This constant positive pressure may allow first housing 304 to be pressurized to any suitable pressure, such as 50 psi, 100 psi, 150 psi, 300 psi, 500 psi, 1,000 psi, or any other suitable pressure. The amount of pressure applied by spring system 360 may be modified in any suitable manner in order to maintain any suitable pressurization of first housing 304. For example, the number, thickness, and/or strength of spring system 360 may be modified in order to maintain any suitable pressurization of first housing 304.

As is discussed above, second housing 308 may include a volume of gas 352. Unfortunately, in particular embodiments, the fluid utilized in vibration isolation system 300 (such as the second volume of fluid 348 and the first volume of fluid 334) may have a tendency to absorb portions of the volume of gas 352 in second housing 308. This absorption may cause a decrease in the amount of pressure that the volume of gas 352 may apply to the second volume of fluid 348 in second housing 308 and the first volume of fluid 334 in first housing 304, which may cause cavitations. According to the illustrated embodiment, second housing 308 may further include seal 364 that may separate the second volume of fluid 348 from the volume of gas 352. In particular embodiments, such separation may prevent the fluid in vibration isolation system 300 from absorbing the volume of gas 352.

Seal 364 may include any element that may be separate the second volume of fluid 348 from the volume of gas 352. For example, seal 364 may be a seal, barrier, enclosure, diaphragm, or any other suitable element that may separate the second volume of fluid 348 from the volume of gas 352. In particular embodiments, seal 364 may be a rolling seal. For example, as piston 356 moves up and down (or in other directions depending on the orientation of vibration isolation system 300), the rolling seal may roll with the movement of the piston so as to continue to separate the second volume of fluid 348 from the volume of gas 352. In particular embodiments, seal 364 may prevent the second volume of fluid 348 from contacting the volume of gas 352, thereby preventing the fluid from absorbing the volume of gas 352. Seal 364 may be positioned at any suitable location in second housing 308 to separate the second volume of fluid 348 from the first volume of gas 352. For example, seal 364 may be positioned around piston 356, in-between piston 356 and the second volume of fluid 348, or any other suitable location. Seal 364 may be made of any suitable material. For example, seal 364 may be made of rubber, latex, a polymer, a rubber-impregnated fabric, or any other suitable material that may separate the second volume of fluid 348 in the second housing 308 from the volume of gas 352 in second housing 308.

In particular embodiments, seal 364 may be permeable to gases in vibration isolation system 300 (such as the volume of gas 352 in second housing 308), but may be impermeable to the fluid in vibration isolation system 300. For example, seal 364 may allow gas to be purged from the second volume of fluid 348 (or the first volume of fluid 334) through seal 364 and into the volume of gas 352 in second housing 308. In such embodiments, such purging of gas through seal 364 may further stabilize internal fluid pressures in vibration isolation system 300. In particular embodiments, such purging of gas may occur when second housing 308 is connected to a top portion of first housing 304. Such a configuration of vibration isolation system 300 may allow the gas trapped or dissolved in the first volume of fluid 334 and/or the second volume of fluid 348 to rise towards seal 364, thereby purging the gas through seal 364.

According to the illustrated embodiment, second housing 308 further includes pressure indicator 368, bleed port 372, and input port 376. Pressure indicator 368 includes any type of system for indicating the internal fluid pressures of vibration isolation system 300. For example, pressure indicator 368 may include a window with one more markings that indicate the pressure, a gauge that presents a representation of the pressure (such as a digital or analog representation), or any other suitable indicator of the pressure. According to the illustrated embodiment, pressure indicator 368 includes a window and one or more markings that indicate the internal fluid pressure of vibration isolation system 300. For example, as is illustrated, piston 356 may include a stem portion that may be viewable through a window in second housing 308. This stem may include any suitable number of markings that represent the internal fluid pressures of vibration isolation system 300. For example, the stem may include a marking that indicates 50 psi, a marking that indicates 100 psi, a marking that indicates 150 psi, and/or markings that indicate any other pressure values, such as 1000 psi. As piston 356 moves up and down (as is discussed above), a particular marking maybe viewable by a user, thereby allowing the user to determine the internal fluid pressure of vibration isolation system 300. In particular embodiments, the markings may be based on temperature. For example, a particular marking may represent 50 psi at 100° F., but may represent a different pressure (such as 75 psi) at 125° F. In such embodiments, second housing 308 may further include a temperature gauge.

In particular embodiments, the indication of internal fluid pressures by pressure indicator 368 may be (or may be based on) an indication of an amount of pressure being applied to the second volume of fluid 348 in second housing 308 and/or the first volume of fluid 334 in first housing 304 by piston 356 (as a result of the pressure applied to piston 356 by the volume of gas 352 and spring system 360). In particular embodiments, the indication may be (or may be based on) an indication of an amount of pressure applied to piston 356 by the second volume of fluid 348 in second housing 308 and/or the first volume of fluid 334 in first housing 304.

In particular embodiments, pressure indicator 368 may allow a user to more easily determine an internal fluid pressure in vibration isolation system 300. As such, vibration isolation system 300 may be devoid of various other systems, such as a Schrader valve and/or sight glass that may have been previously used to calculate internal fluid pressures. In particular embodiments, this may reduce the weight and cost of vibration isolation system 300.

Bleed port 372 includes any system that may allow the volume of gas 352 (and/or any other gas or material) to be purged from second housing 308. For example, bleed port 372 may include an opening that allows the volume of gas 352 in second housing 308 to exit second housing 308, and may further include a cap that may be connected to the opening (such as by screwing the cap into the opening) in order to prevent the volume of gas 352 from exiting second housing 308. As such, the cap may prevent the purging of the volume of gas 352 when connected to the opening, but the cap may also be removed in order to allow the volume of gas 352 to be purged from second housing 308.

Input port 376 may include any suitable opening that may allow fluid to be inserted into second housing 308 and/or first housing 304. For example, input port 376 may include an opening that allows fluid to be inserted into second housing 308 and/or first housing 304, and may further include a cap that may be connected to the opening (such as by screwing the cap into the opening) in order to prevent fluid from being inserted into second housing 308 and/or first housing 304. In particular embodiments, input port 376 may receive a third volume of fluid that may refill (and/or supplement) the first volume of fluid 334 in first housing 304 and/or the second volume of fluid 348 in second housing 308. Input port 376 may receive the third volume of fluid in any suitable manner. For example, a manual or automatic pump may be attached to input port 376 in order to pump the third volume of fluid into vibration isolation system 300. In particular embodiments, by adding the third volume of fluid to the second volume of fluid 348 and/or the first volume of fluid 334, vibration isolation system 300 may be utilized at different temperature ranges than originally designed for. For example, when vibration isolation system 300 is utilized at lower temperatures than originally designed for, the third volume of fluid may be added to vibration isolation system 300 through input port 376 in order to stabilize internal fluid pressures of vibration isolation system 300 at the lower temperatures. In particular embodiments, input port 376 may also allow the second volume of fluid 348 and/or the first volume of fluid 334 to be removed from vibration isolation system 300.

Modifications, additions, or omissions may be made to the vibration isolation system 300 without departing from the scope of the invention. The components of the vibration isolation system 300 may be integrated or separated. Moreover, the operations of the vibration isolation system 300 may be performed by more, fewer, or other components. For example, in particular embodiments, second housing 308 may not include spring system 360.

Figure 4:
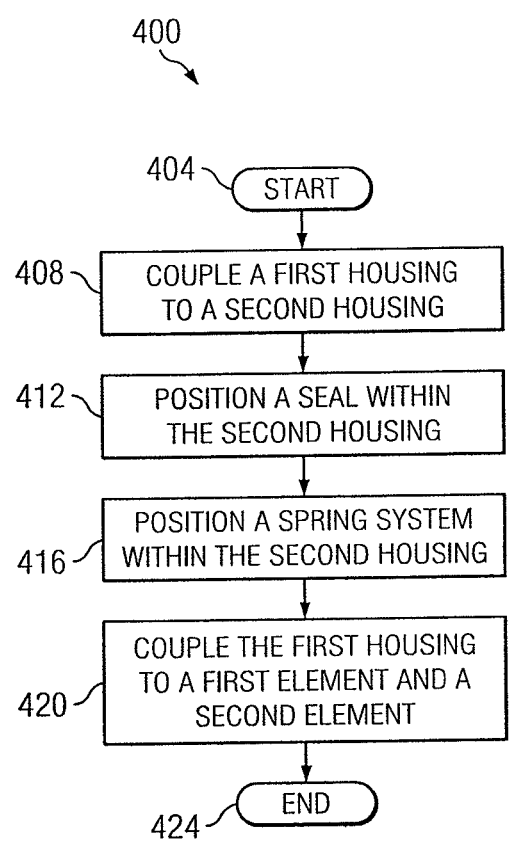
FIG. 4 illustrates one embodiment of a method for building and/or using a vibration isolation system.

FIG. 4 illustrates one embodiment of a method for building and/or using vibration isolation system 300. In particular embodiments, one or more steps of method 400 may be performed using one or more components of FIGS. 1-3 and all of the options discussed above. Examples of the vibration isolation system 300 are described above in FIGS. 1-3.

The method begins at step 404. At step 408, a first housing is coupled to a second housing. The first housing may reduce an amount of movement transferred from the first element to the second element. In particular embodiments, the first housing may substantially reduce the amount of movement transferred from the first element to the second element. The first housing may connect to a first element and to a second element, as is discussed below. In particular embodiments, the first housing may include a first volume of fluid, a first portion that connects to the second element, a second portion that connects to the second element, and a moveable portion that is connected the first portion and the second portion and that connects to the first element. In particular embodiments, the second housing may include a second volume of fluid and a volume of gas. Examples of each of the first housing, second housing, first portion, second portion, moveable portion, first element, and second element are described above in FIGS. 1-3.

At step 412, a seal is positioned within the second housing. The seal may separate the second volume of fluid in the second housing from the volume of gas in the second housing. The seal may be positioned within the second housing in any suitable manner. For example, the seal may be positioned around a piston in the second housing, thereby allowing the seal to separate the second volume of fluid from the volume of gas even when the piston moves up and down (or in any other direction depending on the orientation of the vibration isolation system). Examples of the seal are described above in FIG. 3.

At step 416, a spring system is positioned within the second housing. The spring system may apply pressure to the second volume of fluid in the second housing and the first volume of fluid in the first housing. In particular embodiments, the spring system may provide a constant positive pressure. The spring system may be positioned within the second housing in any suitable manner. Examples of the spring system are described above in FIG. 3.

At step 420, the first housing is connected to a first element and a second element. In particular embodiments, the first and second portions of the first housing may be connected to the second element. Furthermore, the moveable portion of the first housing may be connected to the first element. The first housing may be connected to the first element and the second element in any suitable manner. At step 424, the method ends.

Modifications, additions, or omissions may be made to method 400. For example, one or more steps in method 400 of FIG. 4 may be performed in parallel or in any suitable order. Furthermore, any other components may be utilized to perform one or more steps in method 400 of FIG. 4.

Although FIGS. 1-4 have been described above as including particular components and/or steps, the systems and methods of FIGS. 1-4 may include any combination of any of the described components and any of the options, features, or steps described herein, as would be understood by one of ordinary skill in the art based upon the teachings of the disclosure. For example, any of the options, features, or steps described herein may be utilized in combination with the illustrated embodiments of FIGS. 1-4 and/or any number of the other options, features, or step also described herein, as would be understood by one of ordinary skill in the art based upon the teachings of the disclosure.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. An aircraft, comprising:
   a rotor comprising a plurality of aircraft blades operable to revolve around an axis;
   a first housing comprising:
      a first portion operable to couple to a fuselage of the aircraft;
      a second portion operable to couple to the fuselage of the aircraft;
      a moveable portion operable to couple to the first portion and the second portion, the moveable portion operable to couple to the rotor; and
      a first volume of fluid, wherein the first housing is operable to reduce an amount of movement transferred from the rotor to the fuselage of the aircraft by transferring a portion of the first volume of fluid from the second portion of the first housing to the first portion of the first housing through the moveable portion, wherein the first volume of fluid is operable to be transferred from the second portion of the first housing to the first portion of the first housing due to movement of the moveable portion;
   a second housing coupled to the first housing, the second housing comprising a second volume of fluid and a volume of gas, the first volume of fluid being in fluid communication with the second volume of fluid;
   a rubber rolling seal positioned within the second housing, the rubber rolling seal operable to separate the second volume of fluid from the volume of gas;
   a mechanical spring positioned within the second housing, the mechanical spring operable to apply pressure to the first volume of fluid and the second volume of fluid; and
   a piston positioned within the second housing and between the rubber rolling seal and the mechanical spring;
   wherein the rubber rolling seal is in contact with the second volume of fluid and further positioned between the second volume of fluid and the piston.

2. The system of claim 1, wherein the second housing further comprises a visual indicator that indicates an amount of pressure being applied to the first volume of fluid and the second volume of fluid by the mechanical spring.

3. A system, comprising:
   a first housing comprising a first volume of fluid, the first housing operable to couple to a first element and to a second element, the first housing comprising:

a first portion operable to couple to the second element;
a second portion operable to couple to the second element; and
a moveable portion operable to couple to the first portion and the second portion, the moveable portion further operable to couple to the first element;
a second housing coupled to the first housing, the second housing comprising a second volume of fluid and a volume of gas, the first volume of fluid being in fluid communication with the second volume of fluid;
a seal positioned within the second housing, the seal operable to separate the second volume of fluid from the volume of gas;
a spring system positioned within the second housing, the spring system operable to apply pressure to the first volume of fluid and the second volume of fluid; and
a piston positioned within the second housing and between the seal and the spring system;
wherein the seal is in contact with the second volume of fluid and further positioned between the second volume of fluid and the spring system;
wherein the first housing is operable to reduce an amount of movement transferred from the first element to the second element by transferring a portion of the first volume of fluid from the second portion of the first housing to the first portion of the first housing through the moveable portion, wherein the first volume of fluid is operable to be transferred from the second portion of the first housing to the first portion of the first housing due to movement of the moveable portion.

4. The system of claim 3, wherein the second housing further comprises a visual indicator that indicates an amount of pressure being applied to the first volume of fluid and the second volume of fluid by the spring system.

5. The system of claim 3, wherein the first element and the second element comprise portions of an aircraft selected from a group consisting of:
a helicopter; and
a tilt-rotor aircraft.

6. The system of claim 3, wherein the seal comprises a material selected from a group consisting of:
rubber; and
latex.

7. The system of claim 3, wherein the second housing comprises a port operable to receive a third volume of fluid so as to refill the first volume of fluid and the second volume of fluid.

8. The system of claim 3, wherein the first housing is further operable to transfer a portion of the first volume of fluid in-between the second portion of the first housing and the first portion of the first housing through the moveable portion.

9. The system of claim 3, wherein:
the first portion of the first housing comprises a top portion of the first housing;
the second portion of the first housing comprises a bottom portion of the first housing; and
the second housing is coupled to the top portion of the first housing.

10. The system of claim 3, wherein the first element is selected from a group consisting of:
a rotor of an aircraft;
an engine;
a generator; and
a transmission.

11. A method, comprising:
coupling a first housing to a second housing, the first housing operable to couple to a first element and a second element, wherein:
the first housing comprises:
a first portion operable to couple to the second element;
a second portion operable to couple to the second element;
a moveable portion operable to couple to the first portion and the second portion, the moveable portion further operable to couple to the first element; and
a first volume of fluid; and
the second housing comprises a second volume of fluid and a volume of gas, the first volume of fluid being in fluid communication with the second volume of fluid;
positioning a seal within the second housing, the seal operable to separate the second volume of fluid from the volume of gas;
positioning a spring system within the second housing, the spring system operable to apply pressure to the first volume of fluid and the second volume of fluid; and
positioning a piston within the second housing and between the seal and the spring system;
wherein the seal is in contact with the second volume of fluid and further positioned between the second volume of fluid and the spring system;
wherein the first housing is operable to reduce an amount of movement transferred from the first element to the second element by transferring a portion of the first volume of fluid from the second portion of the first housing to the first portion of the first housing through the moveable portion, wherein the first volume of fluid is operable to be transferred from the second portion of the first housing to the first portion of the first housing due to movement of the moveable portion.

12. The method of claim 11, wherein the second housing further comprises a visual indicator that indicates an amount of pressure being applied to the first volume of fluid and the second volume of fluid by the spring system.

13. The method of claim 11, wherein the first element and the second element comprise portions of an aircraft selected from a group consisting of:
a helicopter; and
a tilt-rotor aircraft.

14. The method of claim 11, wherein the seal comprises a material selected from a group consisting of:
rubber; and
latex.

15. The method of claim 11, wherein the second housing comprises a port operable to receive a third volume of fluid so as to refill the first volume of fluid and the second volume of fluid.

16. The method of claim 11, wherein the first housing is further operable to transfer a portion of the first volume of fluid in-between the second portion of the first housing and the first portion of the first housing through the moveable portion.

17. The method of claim 11, wherein coupling the second housing to the first housing comprises coupling the second housing to a top portion of the first housing, wherein the first portion of the first housing comprises the top portion of the first housing, wherein the second portion of the first housing comprises a bottom portion of the first housing.

18. The method of claim 11, wherein the first element is selected from a group consisting of:
  a rotor of an aircraft;
  an engine;
  a generator; and
  a transmission.

\* \* \* \* \*